United States Patent
Sugawara et al.

(10) Patent No.: US 7,753,294 B2
(45) Date of Patent: Jul. 13, 2010

(54) DISCARDING APPARATUS, DISCARDING SYSTEM AND DISCARDING METHOD

(75) Inventors: Takashi Sugawara, Kanagawa (JP); Hitoshi Suzuki, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 404 days.

(21) Appl. No.: 11/783,567

(22) Filed: Apr. 10, 2007

(65) Prior Publication Data

US 2008/0065263 A1   Mar. 13, 2008

(30) Foreign Application Priority Data

Aug. 11, 2006   (JP) .............................. 2006-219205

(51) Int. Cl.
*B02C 4/32* (2006.01)
*B02C 11/08* (2006.01)

(52) U.S. Cl. ...................... 241/36; 241/101.2

(58) Field of Classification Search ............ 241/36, 241/101.2
See application file for complete search history.

(56) References Cited

U.S. PATENT DOCUMENTS

| | | | | |
|---|---|---|---|---|
| 5,813,009 A | * | 9/1998 | Johnson et al. | 707/100 |
| 6,763,997 B2 | * | 7/2004 | Bennett et al. | 235/375 |
| 7,539,783 B2 | * | 5/2009 | Kochunni et al. | 710/16 |
| 7,551,300 B2 | * | 6/2009 | Wolfman et al. | 358/1.14 |
| 7,574,440 B2 | * | 8/2009 | Kichikawa et al. | 707/9 |
| 7,574,501 B2 | * | 8/2009 | Louie et al. | 709/224 |
| 2006/0180686 A1 | * | 8/2006 | Podrovitz | 241/101.2 |
| 2007/0057099 A1 | * | 3/2007 | Kubo et al. | 241/101.2 |
| 2007/0063082 A1 | * | 3/2007 | Coleman | 241/101.2 |
| 2007/0075168 A1 | * | 4/2007 | Rodriguez et al. | 241/36 |
| 2007/0080249 A1 | * | 4/2007 | Hamasuna et al. | 241/36 |
| 2007/0164135 A1 | * | 7/2007 | Zhong | 241/36 |

FOREIGN PATENT DOCUMENTS

JP   A 2005-262135   9/2005

* cited by examiner

*Primary Examiner*—Bena Miller
(74) *Attorney, Agent, or Firm*—Oliff & Berridge, PLC

(57) ABSTRACT

A discarding apparatus is provided and includes: a discard processing unit that discards a recording medium; an acquiring unit that acquires time information of generating the recording medium, the time information being added to the recording medium; a clock that measures a time; a memory that stores archive information for specifying an archive term of the recording medium; and a controller that controls a discard processing of the discard processing unit so that the discard processing is permitted or prohibited based on the time information, the time and the archive information.

6 Claims, 12 Drawing Sheets

FIG. 8

| DOCUMENT ID | DOCUMENT GENERATING DATE | DOCUMENT TYPE | DOCUMENT ARCHIVE PERIOD | RECEIVED SUM | DOCUMENT DISCARDING DATE |
|---|---|---|---|---|---|
| 0000000001 | 1998.5.31 | PAYMENT APPLICATION | SIX YEARS | 20,000YEN | 2004.6.15 |
| 0000000002 | 1999.12.30 | GENERAL DOCUMENT | NO DESIGNATION | | 2001.1.5 |
| ... | ... | ... | ... | ... | ... |
| 0000012345 | 2000.1.24 | DEPARTMENT COMMUNICATION LETTER | THREE YEARS | | 2003.2.3 |
| 0000012346 | 2001.3.5 | PAYMENT APPLICATION | SIX YEARS | 30,000YEN | NON-DISCARDED |
| ... | ... | ... | ... | ... | ... |
| 0000123456 | 2003.5.6 | GENERAL DOCUMENT | NO DESIGNATION | | 2004.5.10 |
| 0000123457 | 2003.6.8 | PAYMENT APPLICATION | EIGHT YEARS | 100,000YEN | NON-DISCARDED |
| ... | ... | ... | ... | ... | ... |

FIG. 10

| IC CARD ID<br>(HEXADECIMAL NUMBER, 16 DIGITS) | USER NAME<br>(CHARACTER STRING) |
|---|---|
| 010106015805f813 | SATO HANAKO |
| ffffffffffffffff | SUZUKI TARO |
| ⋮ | ⋮ |

*FIG. 11*

| DOCUMENT TYPE | RECEIVED SUM | DOCUMENT ARCHIVE PERIOD |
|---|---|---|
| GENERAL DOCUMENT | NONE | NO DESIGNATION |
| DEPARTMENT COMMUNICATION LETTER | NONE | THREE YEARS |
| PAYMENT APPLICATION | LESS THAN 50,000YEN | SIX YEARS |
| PAYMENT APPLICATION | 50,000YEN OR MORE | EIGHT YEARS |
| ⋮ | ⋮ | ⋮ |

FIG. 12

SHREDDER INFORMATION: NJ100001 #100234 (OR USER SET ID)

DOCUMENT GENERATING INFORMATION

| DATE | TIME | USER ID | DOCUMENT CREATING DATE | DOCUMENT ID | NUMBER OF PROCESSING SHEETS | RESULT OF PROCESSING |
|---|---|---|---|---|---|---|
| 2006/03/20 | 15:53 | fx14443 | 2003/01/15 | 123456 | 15 | PROCESSED |
| 2006/03/20 | 17:22 | fx14443 | 2002/11/30 | 112345 | 2 | PROCESSED |
| 2006/03/23 | 16:12 | fx14443 | 2005/12/30 | 995599 | - | DISABLED |

DISCARDING APPARATUS, DISCARDING SYSTEM AND DISCARDING METHOD

CROSS-REFERENCE TO RELATED APPLICATION

This application is based on and claims priority under 35 USC §119 from Japanese Patent Application No. 2006-219205 filed Aug. 11, 2006.

BACKGROUND (i) Technical Field

The present invention relates to a discarding apparatus, a discarding system and a discarding method which are suitably applied in a management of a recording medium such as a document.

(ii) Related Art

In a public institution such as a company office or a municipal office, generally, a secret document such as a confidential or restricted document is often dealt with. An original of the secret document is stored under strict control in order to prevent a leakage to a third party. The unnecessary secret document is discarded by using a shredder. Moreover, the document is not always discarded but a recording medium such as a CD-R, a DVD-R or an IC card can recently be discarded by using the shredder.

For many secret documents related to accounting (bills, receipts and the settlements of accounts), a period for which the secret documents are to be stored is specified. For this reason, in the case in which the secret document is to be discarded through shredding, a person in charge is to previously ascertain whether a secret document to be a discarding object can be really discarded or not through an original ledger.

In the case in which a large number of secret documents are to be discarded, however, archive periods of the secret documents are to be confirmed one by one and a discarding work is to be thus advanced, which is very complicated and takes a long time. Moreover, there is a possibility that a secret document having a residual archive period might be discarded by mistake due to an artificial confirmation error.

SUMMARY

According to one aspect of the present invention, there is provided a discarding apparatus comprising:

a discard processing unit that discards a recording medium;

an acquiring unit that acquires time information of generating the recording medium, the time information being added to the recording medium;

a clock that measures a time;

a memory that stores archive information for specifying an archive term of the recording medium; and a controller that controls a discard processing of the discard processing unit so that the discard processing is permitted or prohibited based on the time information, the time and the archive information.

BRIEF DESCRIPTION OF THE DRAWINGS

Embodiments of the present invention will be described in detail based on the following figures, wherein:

FIG. 8 is a diagram showing an exemplary document management table;

FIG. 10 is a diagram showing an exemplary user information table;

FIG. 11 is a diagram showing an exemplary document discarding management table, and FIG. 12 is a diagram showing exemplary document discard history information.

DETAILED DESCRIPTION

An exemplary embodiment according to the invention will be described below in detail with reference to the drawings.

Figure 1:
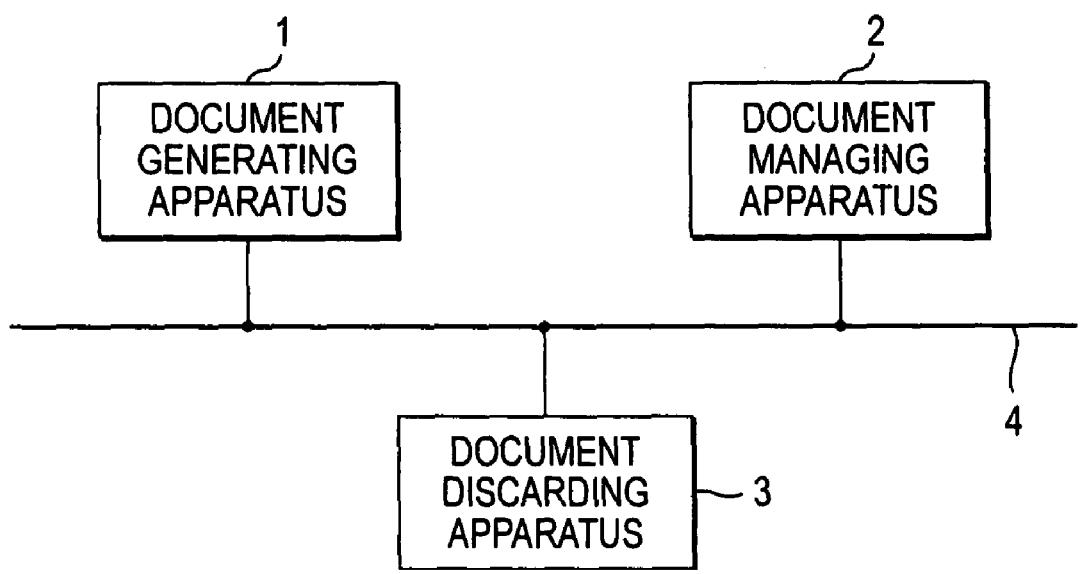
FIG. 1 is a diagram showing a structure of a document managing system according to an exemplary embodiment of the invention.

FIG. 1 is a diagram showing a structure of a document discarding system according to an exemplary embodiment of the invention. The document discarding system which is shown is constituted by using a document generating apparatus 1, a document managing apparatus 2 and a document discarding apparatus 3. The document generating apparatus 1 and the document managing apparatus 2 are connected to each other through a common network 4. The document discarding apparatus 3 is not connected to the network 4 but is provided in a stand-alone state.

The document generating apparatus 1 serves to generate a document (a paper document) to which document generating information such as a document ID, document generating time information, document type information and sum information are added. The document ID is peculiar information which can uniquely specify the document. The document generating time information indicates a generating date or a generating date and time of a document. The document type information indicates a type of a document (a payment application, a general document). Sum information indicates a received sum of a payment application. In the embodiment, it is assumed that the document generating date is treated as the document generating time information. The document managing apparatus 2 serves to carry out various management processings related to a document generated by the document generating apparatus 1. The document discarding apparatus 3 serves to carry out a processing of discarding the document generated by the document generating apparatus 1 and other documents. The network 4 is constituted by using a LAN (Local Area Network) and a WAN (Wide Area Network), for example.

Figure 2:
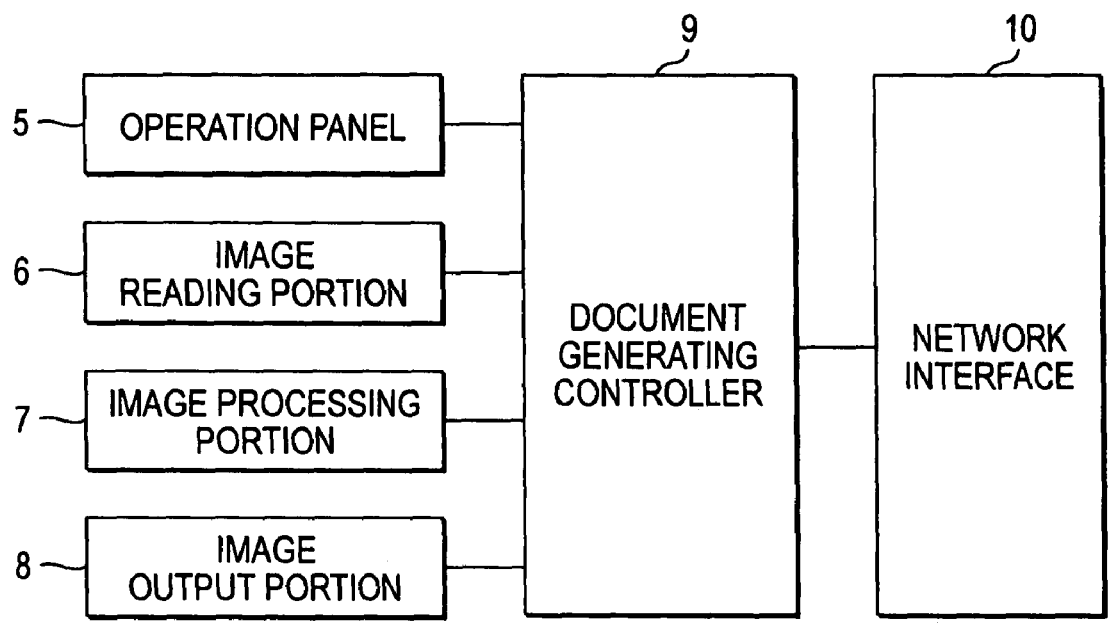
FIG. 2 is a block diagram showing an exemplary structure of a document generating apparatus.

FIG. 2 is a block diagram showing an example of a structure of the document generating apparatus 1. The document generating apparatus 1 is constituted by using a digital copying machine or a digital complex machine (a multifunctional copying machine), for example. The document generating apparatus 1 is constituted by using an operation panel 5, an image reading portion 6, an image processing portion 7, an image output portion 8, a document generating controller 9 and a network interface 10.

The operation panel 5 serves as a user interface for causing a user using the document generating apparatus 1 to input various information and displaying various information to the user. The operation panel 5 is constituted by an input portion having various buttons, a switch and a key, and a display portion constituted by a liquid crystal display having a touch panel, for example.

The image reading portion 6 serves to optically use an image of a document to be a reading object. The image reading portion 6 serves to irradiate a light onto an original surface set onto a transparent original table (a platen glass) and to form an image of a light reflected from the original surface over a light receiving plane of a reading sensor (a CCD sensor) through an image forming optical system such as a mirror or a lens, thereby generating image data (scan data) corresponding to the original image. In that case, the original surface is read and scanned by a movement of, the image forming optical system.

The image processing portion 7 serves to carry out a predetermined image processing (for example, a processing such as a color conversion, a color correction, a gradation correction, an enlargement/reduction, an image rotation or a screen generation) over image data of the original read by the image reading portion 6.

The image output portion 8 serves to print and output the image data read by the image reading portion 6 and subjected to the image processing by the image processing portion 7 onto a recording medium such as a paper. The image output portion 8 serves to print the image data based on an electrophotographic method, for example.

The document generating controller 9 serves to control various processing operations related to the document generation. The document generating controller 9 controls each of the processing operations of the operation panel 5, the image reading portion 6, the image processing portion 7 and the image output portion 8 in accordance with a pregiven control program.

The network interface 10 is a communication interface through which the document generating apparatus 1 transmits/receives data to/from another apparatus (the document managing apparatus 2) over the network 4. The transmission/receipt of the data using the network interface 10 is controlled by the document generating controller 9.

Figure 3:
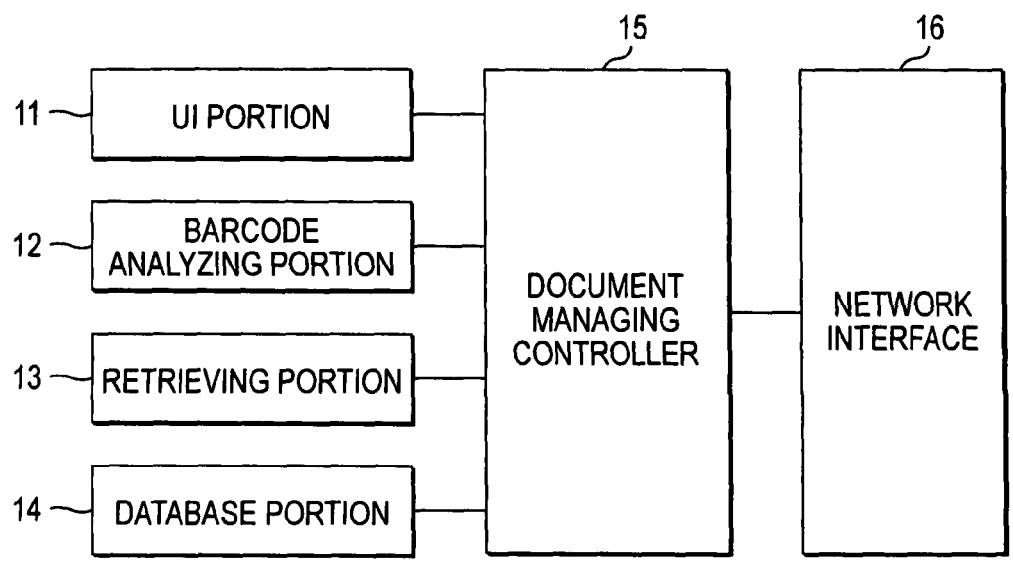
FIG. 3 is a block diagram showing an exemplary structure of a document managing apparatus.

FIG. 3 is a block diagram showing an example of a structure of the document managing apparatus 2. The document managing apparatus 2 is constituted by using a personal computer, for example. The document managing apparatus 2 is constituted by using a user interface portion (UI portion) 11, a bar code analyzing portion 12, a retrieving portion 13, a database portion 14, a document managing controller 15, and a network interface 16.

The user interface portion 11 is a user interface for causing a user using the document managing apparatus 2 to input various information and displaying various information for the user. The user interface portion 11 is constituted by an input device such as a keyboard or a mouse and a display device such as a liquid crystal display, for example.

The bar code analyzing portion 12 serves to analyze a bar code included in image data (scan data) and to carry out a decode processing. The bar code to be analyzed by the bar code analyzing portion 12 is included in image data obtained when reading an image of a document having a bar code through the document generating apparatus 1. The bar code stores document generating information added to the document generated by the document generating apparatus 1 and including a document ID, document generating time information (a document generating date and time), document type information (a payment application and a general document), and sum information (a received sum of the payment application). In general, the bar code is roughly divided into a one-dimensional bar code having information in only a one-dimensional direction and a two-dimensional bar code having information in a two-dimensional direction, and both of them can be utilized for carrying out the invention. In the case in which various information and data are to be stored in one bar code in addition to the document ID, it is desirable to use a two-dimensional bar code having a larger data capacity. In the embodiment, it is assumed that a QR code (a registered trademark) which is a kind of two-dimensional bar code and spreads generally is used as an example.

The retrieving portion 13 serves to retrieve data stored in the database portion 14. The database portion 14 serves to store various data. The database portion 14 is constituted by using a hard disk drive, for example.

The document managing controller 15 serves to control various processing operations related to a document management. The document managing controller 15 controls each of the processing operations of the user interface portion 11, the bar code analyzing portion 12, the retrieving portion 13 and the database portion 14 in accordance with a pregiven control program.

The network interface 16 is a communication interface through which the document managing apparatus 2 transmits/receives data to/from another apparatus (the document generating apparatus 1) over the network 4. The transmission/receipt of the data using the network interface 16 is controlled by the document managing controller 15.

Figure 4:
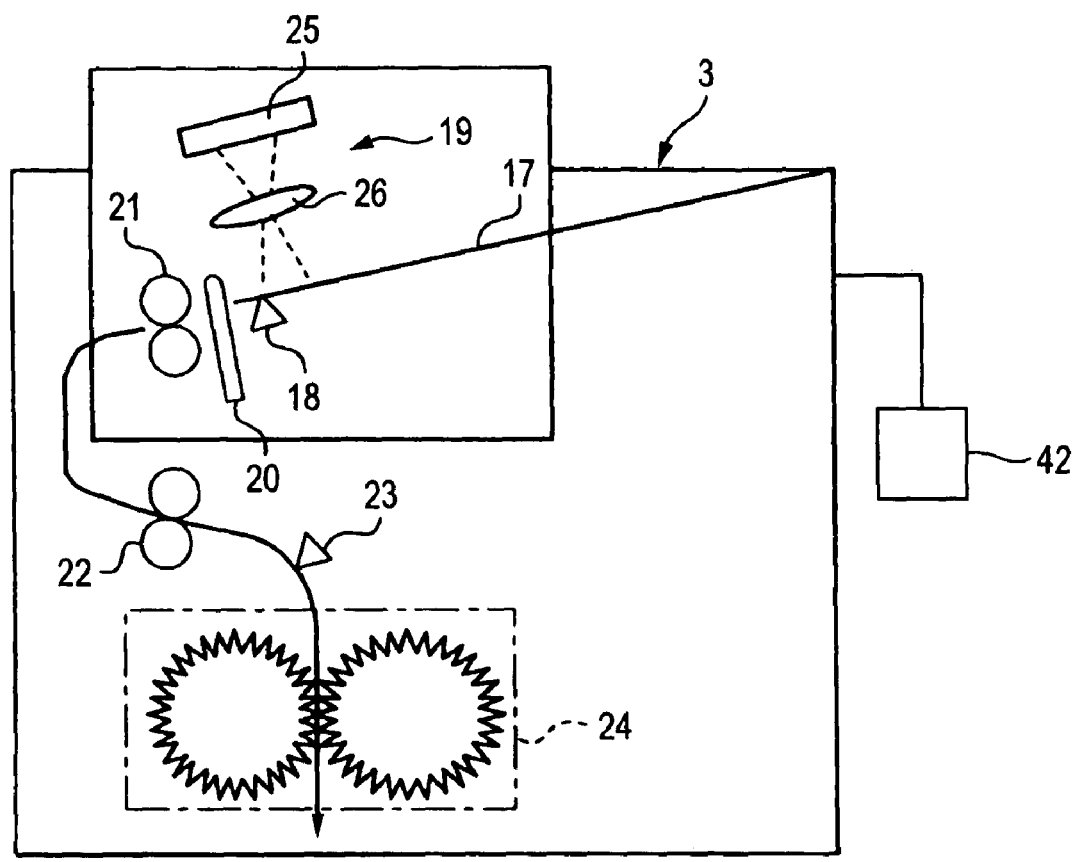
FIG. 4 is a schematic view showing an exemplary of a mechanism of a document discarding apparatus.

FIG. 4 is a schematic view showing an example of a mechanism of the document discarding apparatus 3. The document discarding apparatus 3 is constituted by using a shredder apparatus, for example, and includes a document tray portion 17, an insert sensor 18, a reading optical system 19 of a bar code reader, a stopper 20, feed rolls 21 and 22, a pass sensor 23 and a shredder portion 24.

The document tray portion 17 is a part on which a document to be a discarding object is mounted. The document tray portion 17 is formed in an oblique inclining state with respect to a horizontal plane to have a position lowered gradually toward the stopper 20. An inner side (a lower side) of the document tray portion 17 is covered with a cover member (not shown) together with the insert sensor 18, the reading optical system 19, the stopper 20 and the feed roll 21.

The insert sensor 18 serves to detect that a document is inserted up to a predetermined reading position of the document tray portion 17. The insert sensor 18 is constituted by an optical sensor of a reflection type having a light emitting device and a light receiving device, for example, and is turned ON when the document is present in a sensing position of the insert sensor 18 and is turned OFF when the document is not present in the same sensing position.

The reading optical system 19 of the bar code reader has such a structure as to receive a reflected light of a light irradiated from a light source (not shown) by an area sensor 26 through a lens 25 with respect to a bar code recording portion of a document to be a discarding object, thereby taking an image of a bar code into the area sensor 26. The bar code recording portion implies a portion in which a bar code including a document ID as one information is recorded in a plane of the document, and a position (region) thereof is predefined on a dimensional basis in a document corner portion.

The stopper 20 takes a long plate-shaped structure, for example, and is provided between the insert sensor 18 and the feed roll 21. The stopper 20 serves to open and close a document delivery path formed by the feed rolls 21 and 22 in an entry portion of the document delivery path. In a state in which the stopper 20 is closed, the stopper 20 is disposed on a document path reaching the feed roll 21 from the document tray portion 17 in a protruding state in order to block the same path. When the document mounted on the document tray portion 17 is inserted into an inner side, accordingly, a tip of the document collides with the stopper 20. On the other hand, in a state in which the stopper 20 is opened, the stopper 20 is disposed in a retracting state from the document path reaching the feed roll 21 from the document tray portion 17 in order to be retreated from the same path. When the document mounted on the document tray portion 17 is inserted into the inner side, accordingly, the tip of the document collides with a nip portion of the feed roll 21.

Figure 5:
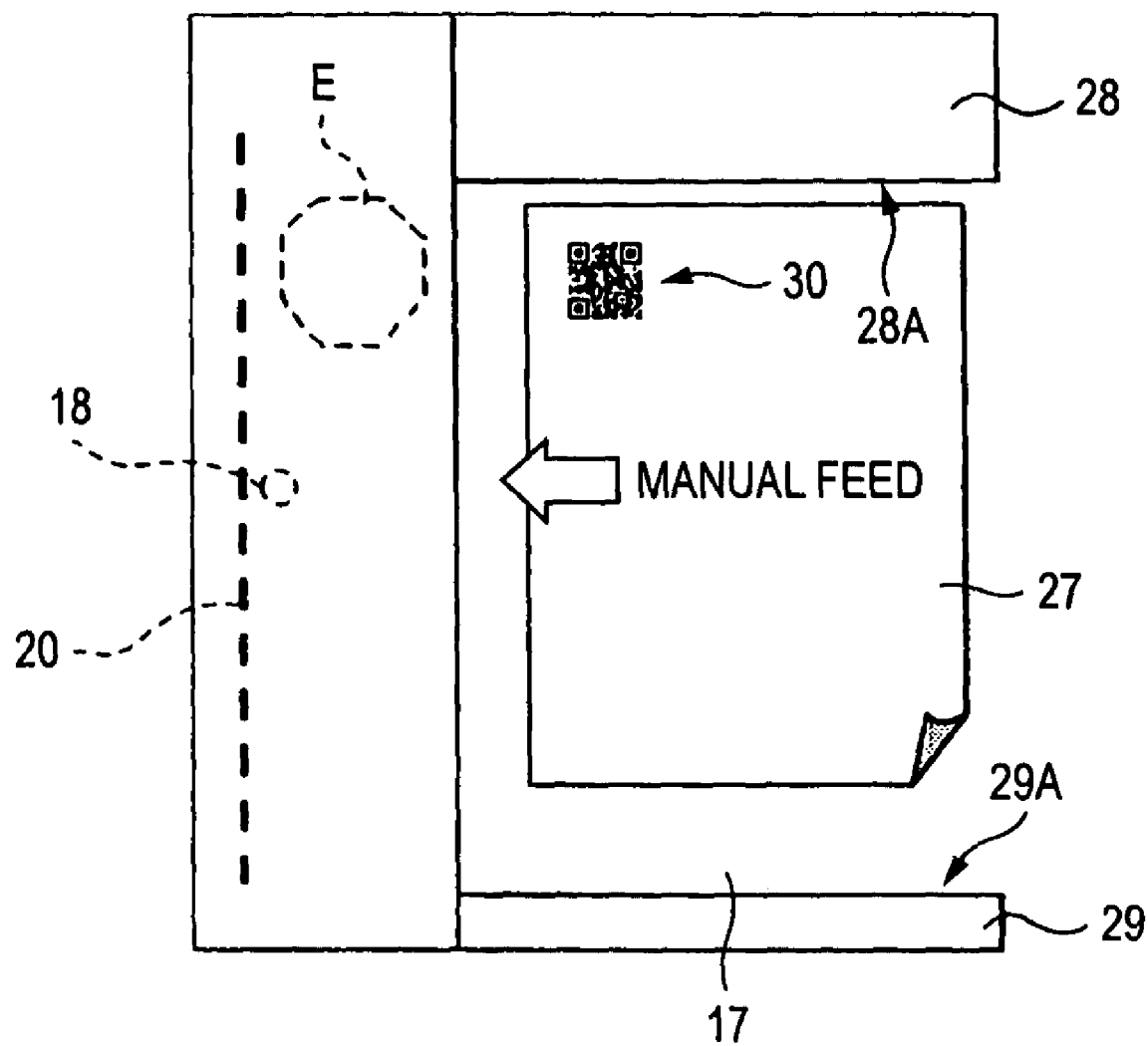
FIG. 5 is a view showing a document tray portion seen from above.

FIG. 5 is a view showing the document tray portion 17 seen from above. The document tray portion 17 has insertion guides 28 and 29 provided on both sides thereof in an inserting direction (a direction of an arrow) in which a document 27 is inserted manually. The insertion guides 28 and 29 have guide surfaces 28A and 29A which are parallel with the document inserting direction. While the insertion guide 28 is provided in a fixing state, the insertion guide 29 is provided movably in a transverse direction (a vertical direction in FIG. 5) of the document if necessary. The document 27 to be a discarding object is inserted in the direction of the arrow in the document tray portion 17 in such a manner that a bar code recording portion 30 is disposed in a corner portion on a tip side thereof. At this time, one of side ends of the document 27 is caused to abut on the guide surface 28A of the insertion guide 28 in order to determine a position of the document 27 in an orthogonal direction to the inserting direction.

In a state in which the tip of the document 27 is caused to collide with the stopper 20 through the manual feed of the user, consequently, the bar code recording portion 30 is positioned and disposed in a code reading area E through a bar code reader. In the document inserting direction, moreover, the insert sensor 18 is disposed upstream of the stopper 20. For this reason, when the tip of the document 27 fed by the hand of the user collides with the stopper 20, the insert sensor 18 is switched from the OFF state to the ON state immediately therebefore. Consequently, a timing for turning ON the insert sensor 18 indicates a timing in which the bar code recording portion 30 of the document 27 is disposed in the code reading area E.

The feed roll 21 serves to nip (interpose) the document inserted by opening the stopper 20, and rotate, thereby delivering the document along the document delivery path. The document delivery path is formed by using a delivery guide member (a chute) which is not shown. The feed roll 22 serves to nip the document delivered by the feed roll 21, and rotate, thereby delivering the document to the shredder portion 24 along the document delivery path.

The pass sensor 23 serves to detect a passage of the document in the middle (an almost intermediate point) of the document delivery path reaching the shredder portion 24 from the feed roll 22. The pass sensor 23 is constituted by an optical sensor of a reflection type having a light emitting device and a light receiving device, for example, and is brought into an ON state when the document is present in a sensing position of the pass sensor 23 and is brought into an OFF state when the document is not present in the same sensing position. At the same time that the tip of the document passes through the sensing position of the pass sensor 23, accordingly, the pass sensor 23 is switched from the OFF state to the ON state. At the same time that a rear end of the document passes through the sensing position of the pass sensor 23, then, the pass sensor 23 is switched from the ON state to the OFF state.

The shredder portion 24 serves to shred the document fed by the feed roll 22 while pulling the same document in one direction (a direction of an arrow). The shredder portion 24 can carry out a shred processing over a plurality of documents (for example, a bundle of approximately 20 plain papers having an A4 size) in a lump. Moreover, it is also possible to carry out the shred processing over a document subjected to a staple processing with a staple needle in an exact state (a state in which the staple needle is not removed).

The document discarding apparatus 3 includes an IC card reader 42 for authenticating a user utilizing the document discarding apparatus 3. The user possesses an IC card recording his (her) own authentication information and puts the IC card over the IC card reader 42 so that a personal authentication is carried out. As an authentication information acquiring unit for acquiring authentication information for authenticating a user of the document discarding apparatus 3, it is also possible to employ a user authenticating technique using an IC card, and furthermore, a password authenticating technique constituted by alphanumeric characters and symbols, a face and iris authenticating technique constituted by a camera (CCD) provided in the document discarding apparatus 3 or a PC connected to the document discarding apparatus 3, and a fingerprint and vein authenticating technique provided in the discarding apparatus or a PC connected thereto.

Figure 6:
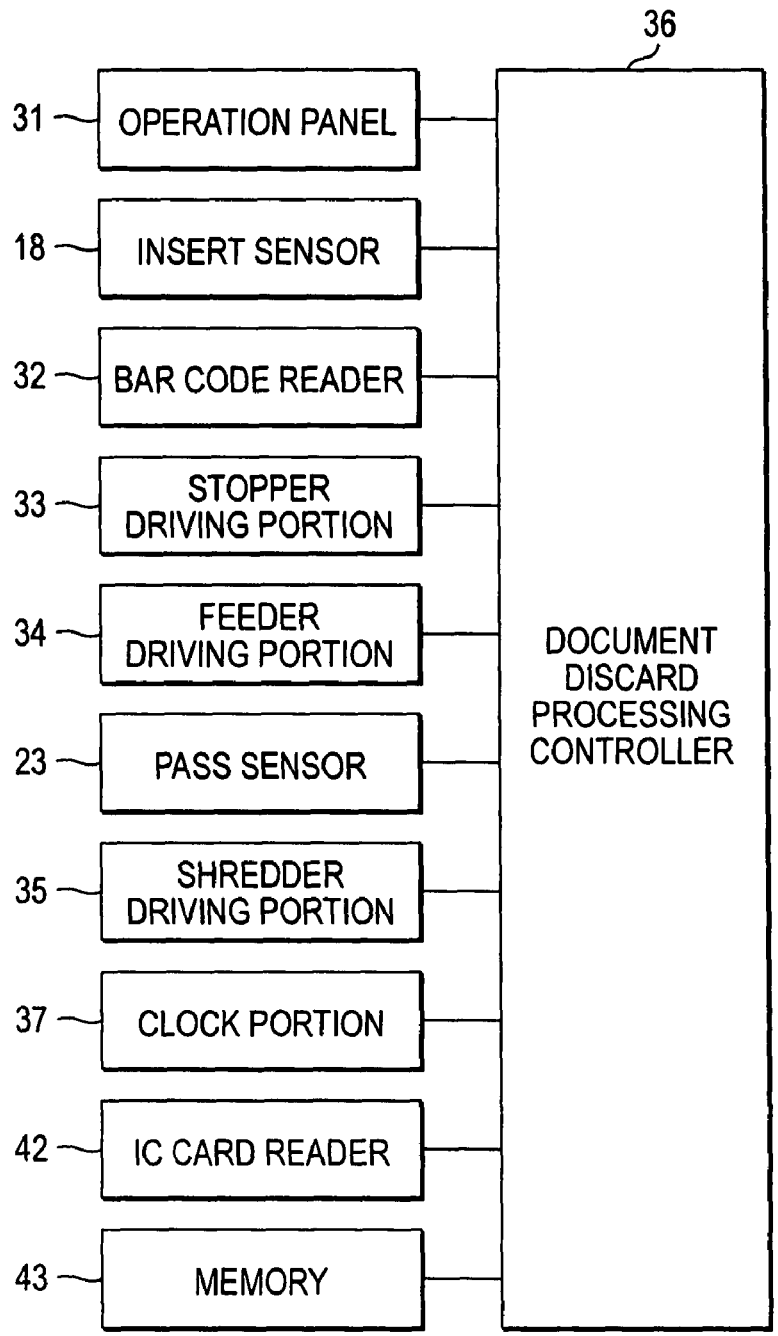
FIG. 6 is a block diagram showing an exemplary structure of the document discarding apparatus.

FIG. 6 is a block diagram showing an example of a structure of the document discarding apparatus 3. The document discarding apparatus 3 comprises an operation panel 31, a bar code reader 32, a stopper driving portion 33, a feeder driving portion 34, a shredder driving portion 35, a document discarding controller 36, a clock portion 37 and a memory 43 in addition to the respective components.

The operation panel 31 is operated by a user utilizing the document discarding apparatus 3. The operation panel 31 is constituted by using an operating button (such as a start button or a stop button) and a display panel for displaying various messages including an operating state of the document discarding apparatus 3 and an operating guidance (a guide message), for example.

The bar code reader 32 serves to optically read a bar code added to a document through printing by using the reading optical system 19, and furthermore, to output original information (data) stored in the bar code in the document based on a result of the reading operation.

The stopper driving portion 33 serves to cause the stopper 20 to carry out an opening and closing (appearing) operation. The stopper driving portion 33 can be constituted with an electromagnetic plunger set to be a driving source, for example.

The feeder driving portion 34 serves to cause the feed rolls 21 and 22 to carry out a rotating operation. The feeder driving portion 34 can be constituted with a motor set to be a driving source, for example.

The shredder driving portion 35 serves to rotate and drive the shredder portion 24. The shredder driving portion 35 can be constituted with a motor set to be a driving source, for example.

The document discard processing controller 36 serves to control various processing operations related to a document discard. The document discard processing controller 36 controls each of the processing operations of the bar code reader 32, the stopper driving portion 33, the feeder driving portion 34 and the shredder driving portion 35 in accordance with a pregiven control program. Moreover, the insert sensor 18 and the pass sensor 23 are electrically connected to the document discard processing controller 36.

The clock portion 37 serves to measure a time such as a current date and time in the document discarding apparatus 3. The memory 43 is used for storing various information, data and programs which are required for controlling the operation and processing of the document discarding apparatus 3. The memory 43 stores a user information table shown in FIG. 10 and a document discarding management table shown in FIG. 11.

Identification information (ID) of an IC card to be used in a personal authentication of a user and a user name are registered correspondingly in the user information table. Information such as a document type, a received sum and a document archive period are registered as information for specifying a document archive term (archive term specifying information) to correspond to each other in the document discarding management table. The contents registered in the document discarding management table may be input through the operation panel 31 after previous log-in in a manager mode by a manager or a history of the archive information stored in the document managing apparatus 2 may be transcribed from the document managing apparatus 2 to the document discarding apparatus 3 by using a removable storing apparatus (for example, a USB memory).

Next, description will be given to a document managing method using the document managing system having the structure. First of all, a document to be dealt with in the invention is generated by the document generating apparatus 1 with peculiar document IDs assigned thereto one by one. The document ID may be constituted by only numerals or by properly combining numerals, alphabets and symbols. Subsequently, description will be given to a specific managing method in the case in which a document to be a reliable paper such as an audit or a tax investigation is dealt with.

Figure 7A:
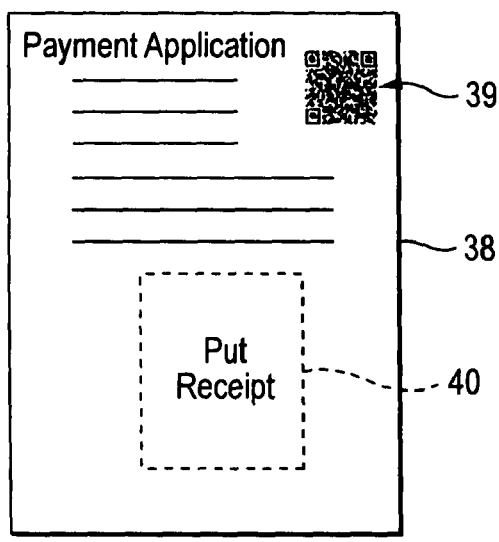
FIGS. 7A and 7B are views for explaining an exemplary creation of a document.

First of all, document data (electronic data) having a bar code to be a model of a document are input to the document generating apparatus 1 and are printed and output to a paper by the image output portion 8 so that a mount of a payment application 38 is created as shown in FIG. 7(A), for example. The document data may be created by the document managing apparatus 2 and may be input from the document managing apparatus 2 to the document generating apparatus 1 via the network 4, for example, or may be created separately by a server apparatus for document data creation and may be input to the document generating apparatus 1 from the server apparatus via the network 4.

Figure 7B:
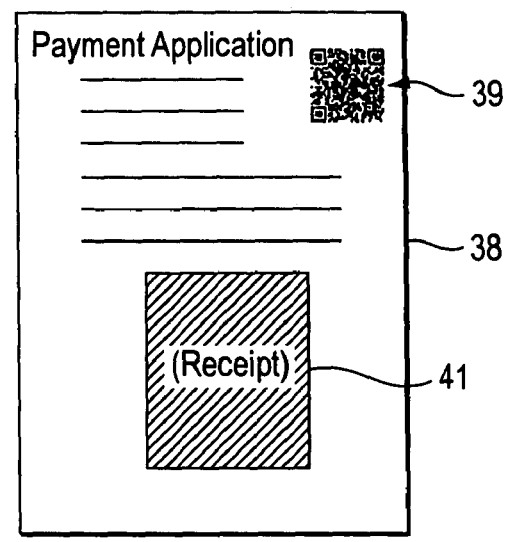

A QR code 39 storing a document ID assigned to the payment application 38 thus generated by the document generating apparatus 1, document generating time information (a document generating date and time), document type information (a payment application and a general document) and sum information (a received sum of the payment application) is added to a corner portion of the payment application 38 through printing. In other words, the payment application 38 generated by the document generating apparatus 1 is a document to which the document generating information are added. Moreover, the mount of the payment application 38 is provided with a region 40 for sticking a receipt thereto. For this reason, an applicant sticks a receipt 41 to the mount of the payment application 38, and furthermore, carries out a retouch and puts a seal if necessary, thereby creating an original of the payment application 38 as shown in FIG. 7(B).

After the payment application 38 is thus created, it is set onto a document table of the document generating apparatus 1 and an image of the payment application 38 is read by the image reading portion 6. Alternatively, the generated information is transmitted from the document generating apparatus 1 to the document managing apparatus 2 through the network 4 and is registered as data. Consequently, the image data of the payment application 38 read by the image reading portion 6 are transmitted to the document managing apparatus 2 via the network 4. Moreover, the original of the payment application 38 which is completely read is filed and archived.

On the other hand, in the document managing apparatus 2 receiving the image data (scan data) of the payment application 38 from the document generating apparatus 1, the image data are stored in the database portion 14, and furthermore, an image of a QR code included in the image data is analyzed by the bar code analyzing portion 12, thereby fetching decode information including the document ID assigned to the payment application 38, the document generating time information (the document generating date and time), the document type information (the payment application and the general document) and the sum information (the received sum of the payment application). The document generating information thus acquired are registered in the document management table by the document managing controller 15. The document management table is created in the database portion 14.

FIG. 8 is a diagram showing an example of the document management table. As shown in FIG. 8, in the document management table, a document ID, a document generating date, document type information, a document archive period, received sum information and a document discarding date are registered to correspond to each other. A document ID obtained by decoding the QR code through the bar code analyzing portion 12 may be registered or a document ID assigned to a document by the document managing apparatus 2 itself or assigned to the document by other server apparatuses may be registered when the document data having the bar code are to be created by the document managing apparatus 2 or the other server apparatuses. The document creating date indicates a date that a document is generated. In the embodiment, the date that the image data read from the document such as the payment application 38 by the document generating apparatus 1 are transmitted to the document managing apparatus 2 is registered as the document generating date. Referring to a secret document to which a receipt is not stuck, however, a date that the document is printed through the image output portion 8 by the document generating apparatus 1 may be registered as the document generating date.

The document type information indicates a type of a document (for example, a general document, a department communication letter or a payment application). The document archive period indicates a period for archiving a document in the number of years, the number of months, the number of days or their combination. A document having a document ID registered in the document management table is to be archived until the document archive period passes. In the case in which the registration is carried out with the document archive period of "no designation", the document can be discarded at any time (discard OK). In the case in which the registration is carried out with the document archive period of "permanent", the document is always treated as "discard disabled".

The received sum information indicates the received sum of the payment application. In general, the document archive period is determined by the received sum. For this reason, if the received sum information is stored in the QR code printed on the payment application 38, for example, it is possible to automatically set the document archive period corresponding to the received sum. More specifically, the document archive period can be set to be six years in the case in which the received sum is smaller than 50000 yen, and the document archive period can be set to be eight years in the case in which the received sum is equal to or greater than 50000 yen. By using the user interface portion 11 provided in the document managing apparatus 2, moreover, it is also possible to set or change the document archive period of the document management table through a manual input of the user (a manual operation).

The document discarding date indicates a date that the document is discarded. The document is discarded by the document discarding apparatus 3. For this reason, the document discarding date of the document management table is input by reading the information such as a document ID and the document discarding date which are described on a document discarding certificate output in a document discard to be carried out by the document discarding apparatus 3 through the image reading portion 5 of the document generating apparatus 1 and transmitting the information to the document managing apparatus 2. Moreover, the document discarding date may be directly input over the document managing apparatus 2 based on information of the document discarding certificate.

Furthermore, a user ID of a user generating the document by the document generating apparatus 1 may be registered as a document generating person in the document management table or a user ID of a user discarding the document by the document discarding apparatus 3 may be registered as a document discarding person in the document management table. In that case, ID information of the user generating or discarding the document can be acquired by utilizing an existing user authenticating technique (for example, a user authenticating technique using an IC card).

Figure 9:
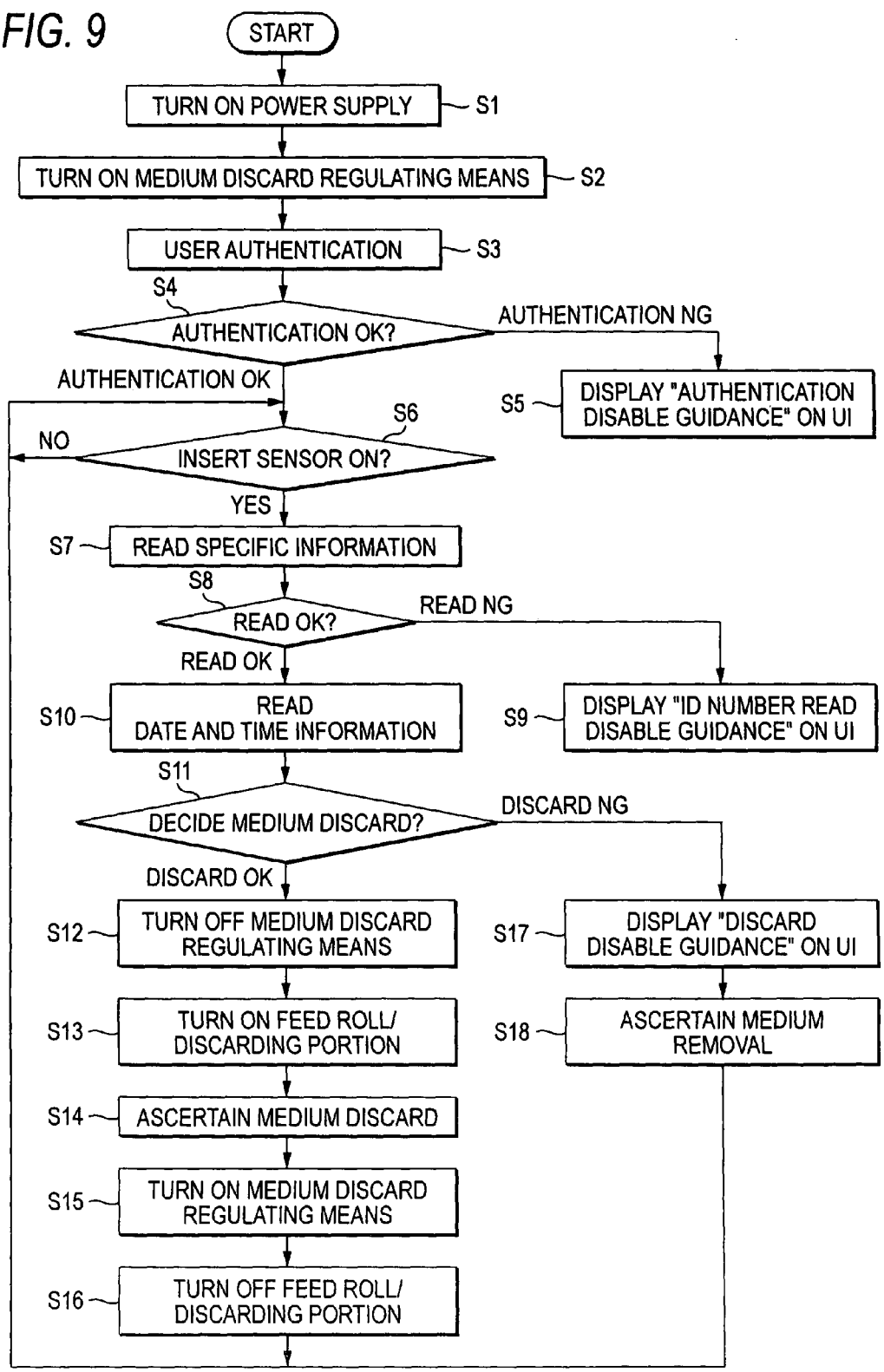
FIG. 9 is a flowchart showing a processing procedure for the document discarding apparatus.

FIG. 9 is a flowchart showing a processing procedure in the case in which a document is discarded by the document discarding apparatus 3. The document discarding apparatus 3 has a normal discarding mode in which code information (the QR code) is not read and a scan discarding mode in which the code information is read. The flowchart of FIG. 9 shows a processing procedure in the scan discarding mode in the case in which setting into the scan discarding mode is carried out in an initial state after a power supply of the document discarding apparatus is turned ON. The initial state brought after the power supply of the document discarding apparatus is turned ON can also be set into the normal discarding mode.

The normal discarding mode can be switched into the normal discarding mode by a discarding mode switching unit which is not shown. In the normal discarding mode, the document discarding apparatus 3 is set into a standby state, and the document discard processing controller 36 gives an instruction for starting a driving operation to the stopper driving portion 33, the feeder driving portion 34 and the shredder driving portion 35 respectively, thereby opening the stopper 20 and starting the driving operations of the feed rolls 21 and 22 and the shredder portion 24 when a start button provided on the operation panel 31 is pushed by the user. When the user using the document discarding apparatus 3 puts a document to be a discarding object on the document tray portion 17 and inserts them into an inner side, consequently, a tip of the document is nipped by the feed roll 21 and is pulled into the apparatus, and is exactly delivered by the feed rolls 21 and 22 and is then shredded by the shredder portion 24.

When a stop button of the operation panel 31 is pushed by the user after the start button of the operation panel 31 is pushed as described above or a predetermined time passes after the start button is pushed, moreover, the document discard processing controller 36 gives an instruction for stopping the driving operation to the stopper driving portion 33, the feeder driving portion 34 and the shredder driving portion 35 respectively, thereby returning the stopper 20 into an original protruding state and stopping the driving operations of the feed rolls 21 and 22 and the shredder portion 24. Consequently, the document discarding apparatus 3 is returned into the standby state again.

On the other hand, when the user using the document discarding apparatus 3 puts the document to be the discarding object on the document tray portion 17 and is inserted into the inner side in the scan discarding mode, the insert sensor 18 is turned ON immediately before the tip of the document collides with the stopper 20. At this time, in the case in which the QR code is printed on the document to be the discarding object, the document is inserted in such a manner that a print surface of the QR code is a topmost surface.

Description will be given to a schematic operation in FIG. 9. First of all, when the power supply of the document discarding apparatus 3 is turned ON (Step S1), the scan discarding mode is maintained in the initial state. Even if a document acting as a recording medium to be discarded is loaded on the document tray 17 to be the medium delivery path of the document discarding apparatus 3, therefore, the loaded document is temporarily prevented from being delivered to the shredder portion 24 to be the discard processing portion because the stopper 20 to be the recording medium regulating unit is brought into a protruding state (Step S2).

Next, the user puts an IC card recording his (her) own authentication information over the IC card reader 42 of the document discarding apparatus 3 so that a personal authentication of the user is carried out (Step S3). More specifically, in the document discarding apparatus 3, it is decided whether or not the processing proceeds to a deciding step of deciding whether a document discard processing is permitted or prohibited based on the authentication information of the user which is read by the IC card reader 42. First of all, whether a user corresponding to identification information of the IC card transmitted as authentication information is a registered user is retrieved based on the user information table (see FIG. 10) stored in the memory 43 in the document discarding apparatus 3, and it is decided that the user is the registered user if relevant identification information is registered. If the personal authentication cannot be confirmed because the relevant identification information is not registered in the user information table so that the authentication ends in failure (authentication NG in Step S4), an "authentication disable guidance" indicating that the authentication is not permitted is displayed on the operation panel 31 (Step S5).

On the other hand, if the relevant identification information is registered in the user information table and the personal authentication can be confirmed, and the authentication ends in success (in case of authentication OK in the Step S4), a signal (in an ON/OFF state) of the insert sensor 18 through the insertion of the document is continuously monitored in this state (Step S6). When the insert sensor 18 is brought into the ON state, an instruction for reading a bar code is given to the bar code reader 32. Then, the bar code reader 32 reads a QR code as document generating information printed on the document in accordance with the reading instruction (Step S7).

Subsequently, the document discard processing controller 36 decides whether the QR code storing the document generating information is successfully read or not (Step S8). Whether the QR code is successfully read is decided depending on whether the QR code printed on the document can be normally subjected to a decode processing by the bar code reader 32. The case in which the bar code reader 32 fails in the read of the QR code includes the case in which a remarkable contamination or breakage is generated on the QR code printed on the document, the case in which the QR code is not originally printed on the document or the case in which the QR code of the document is provided out of the reading area E (see FIG. 5) because the document is improperly inserted. If the read of the QR code ends in failure (in case of read NG) at the Step S8, a prepared read disable guidance is displayed on the operation panel 31 (Step S9). An example of the read disable guidance can include "A code reading error is generated. Please pull out the document".

If the read of the QR code ends in success (in case of read OK in the Step S8), the document discard processing controller 36 reads current time information (date and time information) from the clock portion 37 (Step S10). Next, it is decided whether the document passes through the archive period and is permitted to be discarded or not (Step S11). The document discarding apparatus 3 stores the document discarding management table shown in FIG. 11 in the memory 43 and compares the document generating date included in the QR code read successfully, the information of the document discarding management table and the current time information of the clock portion 37, thereby deciding whether the document passes through the document archive period or not.

Description will be given to an example of a specific processing to be carried out in the case in which it is decided whether the document passes through the archive period and is permitted to be discarded at the Step S11. For example, in the case in which a document specified by a document ID of "0000123457" shown in FIG. 8 is inserted into the document discarding apparatus 3, a document ID of "0000123457", document generating date information of "2003. 6. 8", document type information of "payment application" and sum information of "100,000 YEN" which are included in the QR code of the document are read by the bar code reader 32 of the document discarding apparatus 3. Next, the document discarding apparatus 3 refers to the discarding management table (FIG. 11) stored in the same apparatus, thereby extracting the document archive period and specifying a document archive term based on the archive period thus extracted.

In case of the document having the document ID of "0000123457", the document type information is the "payment application" and the received sum is "50,000 YEN or more". Therefore, the document archive period is extracted as "eight years". Furthermore, a date of "2011. 6. 8" that the "eight years" to be the document archive period passes since "2003. 6. 8" of the document generating date information is specified as the document archive term. In the case in which the current date acquired from the clock portion 37 of the document discarding apparatus 3 is "2006. 3. 1", for example, the specified document archive term is not passed. Therefore, it is decided that the discard of the document is not permitted (the discard of the document is prohibited). In the case in which the document type information is a "general document", moreover, the archive period is not designated (the discard can be carried out at any time). Therefore, it is decided that the discard of the document is permitted.

The document type information and the received sum information are used to extract the document archive period in the embodiment. In the case in which the document archive period is included in the document generating information added to the document by the document generating apparatus 1, however, the archive period may be extracted therefrom. In the case in which the document type is a general document or a department communication letter, moreover, it is possible to extract the document archive period without referring to the received sum information.

By such a processing, the document discard processing controller 36 decides whether the discard of the inserted document is permitted or prohibited. If it is decided that the discard of the document is permitted, a prepared discard permission guidance (guide message) is displayed on the operation panel 31 and an instruction for opening the stopper 20 is then given to the stopper driving portion 33 to open the stopper 20 in order to permit the document discard processing based on the result of the decision (Step S12). Moreover, the document discard processing controller 36 gives the feeder driving portion 34 an instruction for starting a rotation of the feed rolls 21 and 22 at this time, and the feeder driving portion 34 starts the rotating and driving operations of the feed rolls 21 and 22 in accordance with the instruction (Step S13). As an example of a discarding permission guidance, it is possible to propose "The stopper will be open to discard the document. Please insert the document into a further inner side."

When the user inserts the document in accordance with the guidance displayed on the display panel 31, then, the tip of the document is caused to collide with the nip portion of the feed roll 21, and furthermore, is fed to a downstream side of the document delivery path in accordance with the rotation of the feed roll 21. Thus, the document fed through the feed roll 21 is transferred to the feed roll 22 on a downstream side in a delivery direction and is delivered to the shredder portion 24 in accordance with the rotation of the feed roll 22. At this time, when a read end of the document passes through the sensing position of the insert sensor 18 so that the insert sensor 18 is switched from an ON state to an OFF state, the document discard processing controller 36 gives the stopper driving portion 33 an instruction for recovering the stopper 20 in a predetermined timing (for example, a timing in which the rear end of the document passes through the feed roll 21), thereby returning the stopper 20 into the original state (the protruding state).

When the tip of the document passes through the sensing position of the pass sensor 23 during the delivery carried out by the feed roll 22 so that the pass sensor 23 is switched from the OFF state to the ON state, moreover, the document discard processing controller 36 gives the shredder driving portion 35 an instruction for starting a driving operation. Upon receipt of the instruction, the shredder driving portion 35 starts the driving operation of the shredder portion 24. Accordingly, the document fed by the feed roll 22 is exactly taken into the shredder portion 24 and is subjected to a shred processing (a discard processing) therein.

When the rear end of the document passes through the sensing position of the pass sensor 23 so that the pass sensor 2 is switched from the ON state to the OFF state, then, the document discard processing controller 36 creates a document ID of the document which previously receives the document discarding permission and discard history information such as "a discard processing result", "a discarding date and time", "a discard executing person" and "the number of sheets to be discarded" as a discarding confirmation of the document to be the recording medium after a predetermined time from the time that the pass sensor 23 is brought into the OFF state (more specifically, after a time required for taking the rear end of the document into the shredder portion 24 and shredding the whole document) (Step S14). In this case, information about the "discard executing person" may be user information retrieved based on the identification information obtained by the authenticating unit in starting. The discard history information to be a discarding completion certificate indicating that the document is completely discarded is stored as a message in the document discarding apparatus 3. Thereafter, the stopper 20 to be the recording medium regulating unit is brought into the protruding state so that the delivery to the shredder portion 24 to be the discard processing portion is temporarily stopped (Step S15). Then, the feeder driving portion 34 stops the rotating and driving operations of the feed rolls 21 and 22 (Step S16).

If it is decided that the discard of the document is prohibited at the Step S11, moreover, a prepared discard disable (discard prohibiting) guidance is displayed on the operation panel 31 in order to prohibit the document discard processing based on the result of the decision (Step S17). As an example of the discard disable guidance, it is possible to propose "The discard of the document is prohibited. Please pull the document out." If the insert sensor 18 is switched from the ON state to the OFF state so that the user takes the document out of the document tray portion 17 to confirm the removal of the medium at the Step S18, next, the document discarding apparatus 3 is returned into the standby state in which the discard processing is stopped.

In the document managing system, the QR code added to the document is read by the bar code reader 32 and the document generating information included in the QR code is acquired, and furthermore, it is decided whether the discard of the document is permitted or prohibited based on the document generating information, the time information acquired from the clock portion 37 and the discarding management table (discard term specifying information) stored in the memory 43 in the document discarding apparatus 3. There is employed the structure in which the document discard processing is carried out by the shredder portion 24 if the discard is permitted. Even if a person in charge does not confirm the document discard enable or disable in detail differently from the conventional art, therefore, it is possible to reliably discard only a document passing through the archive period. Moreover, it is possible to avoid an erroneous discard of the document due to an artificial confirmation error.

When the document discard processing (shred processing) is carried out by the document discarding apparatus 3, furthermore, it is possible to store and leave a date (more preferably, a date and time) that the document is discarded as a history in the memory 43 in relation to the document ID of the document. In addition, it is also possible to store and leave a user ID of a document discarding person in charge of the discard of the document as one of the discard history information in the memory 43. As a result, for example, a designation of an input of the document ID is accepted by the operation panel 31 and discard history information corresponding to the designated document ID is read from the memory 43 and is displayed on the operation panel 31. Consequently, it is possible to ascertain when a document specified by a certain document ID was discarded and who discarded the same document over the operation panel 31.

By employing a structure in which a date (more preferably, a date and time) that a document is generated and a user ID of a document generating person in charge of the document generation are registered in the document management table of the document managing apparatus 2 in addition to a document ID of the document when the document generation processing (print processing) is carried out in the document generating apparatus 1, moreover, it is possible to ascertain when a document specified by a certain document ID was generated and who generated the same document later over the operation panel 31.

While there is employed the structure in which the discard history information of the document is confirmed over the operation panel 31 of the document discarding apparatus 3 in the embodiment, moreover, a print output portion which is not shown may be provided in the document discarding apparatus 3 to print and record the discard history information of the document on a paper as shown in FIG. 12. Moreover, the discard history information may be printed and output as a QR code onto the paper. Furthermore, it is also possible to provide, in the document discarding apparatus 3, an information writing device capable of electronically writing data, for example, a card reader/writer or a media reader/writer and to electronically record and output the discard history information onto a memory card or a recording medium by using the information writing device.

By recording, on the document discard history information, an identification symbol (for example, "NJ100001#100234") of the document discarding apparatus 3 which discards the document, moreover, it is possible to manage the use of any document discarding apparatus in order to discard the document. In the case in which the document discard history information is thus printed and output in the QR code onto a paper, for example, an image of the QR code printed on the paper is read by the image reading portion 6 of the document generating apparatus 1 and image data of the QR code are transferred to the document managing apparatus 2 and are subjected to a decode processing by the bar code analyzing portion 12 of the document managing apparatus 2 so that the document discard history information can be fetched into the document managing apparatus 2. By relating a document ID of the document generating information registered in the document managing apparatus 2 to a document ID of document discard history information fetched newly, it is possible to carry out a management from the generation of the document to the discard thereof as shown in FIG. 8.

As a method of fetching the document discard history information into the document managing apparatus 2, moreover, an image of a paper (an original) on which the document discard history information is printed as the QR code is read. In addition, it is also possible to record the document discard history information in a removable portable recording medium (for example, a USB memory) and to transcribe the document discard history information from the document discarding apparatus 3 to the document managing apparatus 2 by using the recording medium, for example.

While the QR code for storing the document generating information is printed on the document generated by the document generating apparatus 1 in the embodiment, furthermore, the invention is not restricted thereto but the document generating information may be added to the document by sticking a label.

Although the document discarding apparatus has been described as the shredder in the embodiment, moreover, the invention is not restricted thereto but the discarding apparatus may burn and fuse a document, and may deliver the document to a discarding box and may discard the same document.

While the description has been given to the case in which the document generating information to be added to the document in the document generating apparatus 1 is directly recorded on the document to be discarded, for example, the QR code, furthermore, it is also possible to record the generating information on a separate document from the document to be discarded and an IC card and to read the information or to directly input the information to the document discarding apparatus 3.

Although the description has been given on assumption that the recording medium to be subjected to the discard processing is set to be the document in the embodiment, moreover, the invention is not restricted thereto but a recording medium such as a CD-R, a DVD-R or an IC card which records secret information may be discarded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

(S1) Turn ON a power supply (S2) Turn ON medium discard regulating means (S3) User authentication (S4) Authentication OK?

(S5) Display an "authentication disable guidance" on a UI (S6) Insert sensor ON?

(S7) Read specific information (S8) Read OK?

(S9) Display an "ID number read disable guidance" on the UI (S10) Read date and time information (S11) Decide a medium discard (S12) Turn OFF the medium discard regulating means (S14) Ascertain the medium discard (S15) Turn ON the medium discard regulating means (S16) Turn OFF the feed/roll discarding portion (S17) Display a "discard disable guidance" on the UI (S18) Ascertain a medium removal

What is claimed is:

1. A discarding apparatus comprising:
   a discard processing unit that discards a paper recording medium;
   a physical document tag attaching unit that attaches a bar code or QR code, which includes at least time information of generating the paper recording medium, to the paper recording medium as a physical document tag;
   an acquiring unit that acquires the time information;
   a clock that measures a time;
   a memory that stores archive information for specifying an archive term of the paper recording medium; and
   a controller that controls a discard processing of the discard processing unit so that the discard processing is permitted or prohibited based on the time information, the time and the archive information.

2. The discarding apparatus according to claim 1, further comprising a regulating unit that regulates an insertion of the paper recording medium into the discard processing unit, the controller controlling an operation of the regulating unit so as to control the discard processing of the discard processing unit.

3. The discarding apparatus according to claim 1, further comprising an output unit that outputs discard history information related to the paper recording medium discarded.

4. A discarding system comprising:
   a generating apparatus that generates a paper recording medium and adds generating information including time information of generating the paper recording medium;
   a physical document tag attaching unit that attaches a bar code or QR code, which includes the time information, to the paper recording medium as a physical document tag;
   a discarding apparatus that discards the paper recording medium, the discard apparatus comprising:
   a discard processing unit that discards the recording medium,
   an acquiring unit that acquires the generating information,
   a clock that measures a time,
   a memory that stores archive information for specifying an archive term of the paper recording medium,
   a controller that controls a discard processing of the discard processing unit so that the discard processing is permitted or prohibited based on the generating information, the time and the archive information, and
   an output unit that outputs discard history information related to the paper recording medium discarded; and
   a managing apparatus that manages a discard of the paper recording medium, the managing apparatus reads and relates the discard history information to the generating information.

5. The discarding system according to claim 4, wherein the discarding apparatus further comprises a regulating unit that regulates an insertion of the paper recording medium into the discard processing unit, the controller controlling an operation of the regulating unit so as to control to the discard processing of the discard processing unit.

6. A method for discarding a paper recording medium, comprising:
   attaching a bar code or QR code, which includes at least time information of generating the paper recording medium, to the paper recording medium as a physical document tag;
   acquiring the time information;
   acquiring a time;
   acquiring archive information for specifying an archive term of the paper recording medium; and
   carrying out a control of the discarding of the paper recording medium so that the discarding is permitted or prohibited based on the time information, the time and the archive information.

* * * * *